US009619049B2

(12) United States Patent
Bostick et al.

(10) Patent No.: US 9,619,049 B2
(45) Date of Patent: Apr. 11, 2017

(54) ONE-HANDED OPERATION OF MOBILE ELECTRONIC DEVICES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 14/624,656

(22) Filed: Feb. 18, 2015

(65) Prior Publication Data

US 2016/0239105 A1  Aug. 18, 2016

(51) Int. Cl.
*G06F 3/0346* (2013.01)
*G06F 1/16* (2006.01)
*G06F 3/01* (2006.01)
*G06F 3/0354* (2013.01)

(52) U.S. Cl.
CPC ............ *G06F 3/0346* (2013.01); *G06F 1/163* (2013.01); *G06F 1/1694* (2013.01); *G06F 3/014* (2013.01); *G06F 3/017* (2013.01); *G06F 3/03547* (2013.01); *G06F 2200/1637* (2013.01); *G06F 2203/0331* (2013.01)

(58) Field of Classification Search
CPC ........ G06F 1/163; G06F 3/014; G06F 3/0414; G06F 3/04817; G06F 2203/04102
See application file for complete search history.

(56) References Cited

U.S. PATENT DOCUMENTS

| 6,388,247 B2 | 5/2002 | Asada et al. |
| 8,725,842 B1 | 5/2014 | Al-Nasser |
| 2007/0103454 A1 | 5/2007 | Elias |
| 2007/0291008 A1 | 12/2007 | Wigdor et al. |

(Continued)

FOREIGN PATENT DOCUMENTS

KR  101359023 B1  1/2014

OTHER PUBLICATIONS

Chen et al., "Duet: Exploring Joint Interactions on a Smart Phone and a Smart Watch", CHI 2014, One of a CHInd, Toronto, ON, Canada, Apr. 26-May 1, 2014, Copyright 2014 ACM, pp. 159-168.

(Continued)

*Primary Examiner* — Premal Patel
(74) *Attorney, Agent, or Firm* — Bryan D. Wells; David M. Quinn

(57) ABSTRACT

One-handed operation of a wearable computing device is provided. An indicator is displayed on a graphical user interface of a wearable computing device. A directional displacement of an interface device is determined, wherein the interface device is removably connected to a finger of a user of the wearable computing device. An association is made between the indicator and a graphical user interface object based, at least in part, on the directional displacement of the interface device. A graphical user interface is modified to visually indicate the association between the indicator and a graphical user interface object. In response to determining that a force exerted by a surface in contact with the interface device exceeds a threshold, a graphical user interface object is activated.

17 Claims, 4 Drawing Sheets

(56) References Cited

U.S. PATENT DOCUMENTS

| | | | |
|---|---|---|---|
| 2009/0073117 A1* | 3/2009 | Tsurumi | G06F 3/005 345/158 |
| 2010/0039392 A1 | 2/2010 | Pratt et al. | |
| 2013/0147754 A1 | 6/2013 | Chuang | |
| 2013/0207900 A1 | 8/2013 | Harooni | |
| 2014/0034074 A1 | 2/2014 | Schwartz | |
| 2014/0098067 A1 | 4/2014 | Yang et al. | |
| 2014/0198035 A1* | 7/2014 | Bailey | G06F 3/014 345/156 |
| 2015/0338916 A1* | 11/2015 | Priyantha | G06F 3/017 345/173 |
| 2016/0011660 A1* | 1/2016 | Wieder | G06F 3/04815 345/158 |

OTHER PUBLICATIONS

Elgan, Mike; "Ready for your electronic tattoo?", Computerworld | Mar 15, 2014, Copyright @ 1994-2014 Computerworld, Inc., <http://www.computerworld.com/article/2488638/emerging-technology/ready-for-your-electronic-tattoo-.html>.

IBM et al.,"Text input on a smart watch with a roller wheel and touch screen", An IP.com Prior Art Database Technical Disclosure, Original Publication Date: Jun. 15, 2004, IP.com No. 000029075, IP.com Electronic Publication: Jun. 15, 2004.

Morganti et al.,"A smart watch with embedded sensors to recognize objects, grasps and forearm gestures", International Symposium on Robotics and Intelligent Sensors 2012 (IRIS 2012), Procedia Engineering 41 ( 2012 ) 1169-1175, © 2012 Published by Elsevier Ltd.

"A method for wearable devices user interaction", An IP.com Prior Art Database Technical Disclosure, Authors et. al.: Disclosed Anonymously, IP.com No. 000234134, IP.com Electronic Publication: Jan. 14, 2014.

"Fleksy Labs: Omate smartwatch ", Youtube, as provided in Main idea by inventor, printed on Nov. 21, 2014. <https://www.youtube.com/watch?v=rxW702lo-Ac >.

* cited by examiner

ONE-HANDED OPERATION OF MOBILE ELECTRONIC DEVICES

BACKGROUND OF THE INVENTION

The present invention relates generally to the field of mobile computing devices, and more particularly to control interfaces for mobile computing devices.

Small mobile computing devices enable the continued integration of computer system functionality into everyday life. For example, small mobile computing devices, such as miniaturized computers, input devices, sensors, detectors, image displays, wireless communication devices as well as image and audio processors, can be integrated into a device that can be worn by a user. Examples of wearable computing devices include watches, eyeglasses, sunglasses, goggles, jackets, and other articles of clothing that support various levels of functionality. Wearable computing devices potentially provide mobile and lightweight solutions to computing and communication challenges.

Smart watches, eyeglasses, and sunglasses are examples of wearable computing devices that can support traditional, rigid displays and hardware that is sufficient to provide useful functionality. Smart watches, for example, can incorporate touch sensitive liquid crystal or light emitting diode (LED) display technologies that are mature and analogous to technologies used in smart phone displays. In general, smart watches can also support sufficient hardware to provide functionality that includes time-keeping, location finding, fitness tracking, and making and receiving telephone calls. In general, users interact with smart watches via a graphical user interface (GUI), physical buttons, sliders, and switches. Size, weight, and wearability constraints, however, limit the functionality of wearable computing devices.

SUMMARY

According to one embodiment of the present disclosure, a method for one-handed operation of a mobile electronic device is provided. The method includes displaying, by one or more computer processors, an indicator on a graphical user interface of a wearable computing device; determining, by one or more computer processors, a directional displacement of an interface device, wherein the interface device is a wearable electronic device that is removably connected to a finger of a user of the wearable computing device; responsive to associating, by one or more computer processors, the indicator with a graphical user interface object based, at least in part, on the directional displacement of the interface device, modifying, by one or more computer processors, the graphical user interface to visually indicate the association between the indicator and the graphical user interface object; and responsive to determining, by one or more computer processors, that a force exerted by a surface in contact with the interface device exceeds a threshold, activating, by one or more computer processors, the graphical user interface object.

According to another embodiment of the present disclosure, a computer program product for one-handed operation of a mobile electronic device is provided. The computer program product comprises a computer readable storage medium and program instructions stored on the computer readable storage medium. The program instructions include program instructions to display, by one or more computer processors, an indicator on a graphical user interface of a wearable computing device; program instructions to determine, by one or more computer processors, a directional displacement of an interface device, wherein the interface device is a wearable electronic device that is removably connected to a finger of a user of the wearable computing device; program instructions to, responsive to associating, by one or more computer processors, the indicator with a graphical user interface object based, at least in part on, the directional displacement of the interface device, modify, by one or more computer processors, the graphical user interface to visually indicate the association between the indicator and the graphical user interface object; and program instructions to, responsive to determining, by one or more computer processors, that a force exerted by a surface in contact with the interface device exceeds a threshold, activate, by one or more computer processors, the graphical user interface object.

According to another embodiment of the present disclosure, a computer system for one-handed operation of a mobile electronic device is provided. The computer system includes one or more computer processors, one or more computer readable storage media, and program instructions stored on the computer readable storage media for execution by at least one of the one or more processors. The program instructions include program instructions to display, by one or more computer processors, an indicator on a graphical user interface of a wearable computing device; program instructions to determine, by one or more computer processors, a directional displacement of an interface device, wherein the interface device is a wearable electronic device that is removably connected to a finger of a user of the wearable computing device; program instructions to, responsive to associating, by one or more computer processors, the indicator with a graphical user interface object based, at least in part on, the directional displacement of the interface device, modify, by one or more computer processors, the graphical user interface to visually indicate the association between the indicator and the graphical user interface object; and program instructions to, responsive to determining, by one or more computer processors, that a force exerted by a surface in contact with the interface device exceeds a threshold, activate, by one or more computer processors, the graphical user interface object.

DETAILED DESCRIPTION

Embodiments of the present disclosure recognize a need for one-handed interaction with a wearable computing device. Interacting with wearable computing devices, such as smart watches, requires the use of two hands, which is less convenient than interacting with handheld mobile computing devices, such as smart phones. For example, a smart phone user can hold a smart phone in one hand and interact with the smart phone with the same hand to perform actions such as typing or making phone calls, leaving the other hand free to interact with the surrounding environment. Smart watches, however, are generally worn on a wrist of the user. Embodiments recognize that interacting with such devices with a "proximate hand" (i.e., the hand of the arm on which the wearable computing device is worn) is difficult. It is generally impossible or impractical to use the proximate hand to interact with controls integrated into the smart watch. Consequently, interacting with a device worn on one arm requires positioning the device with the one arm and interacting with the device with the hand of the other arm, thereby preventing free interaction with the surrounding environment.

Embodiments of the present disclosure allow a user to interact with a wearable computing device (e.g., a smart watch) using the proximate hand. Toward facilitating explanation, a smart watch is used as a representative example of a wearable computing device worn by a user on a portion of an arm (e.g., a wrist) of the user. The ability to interact with the smart watch using the proximate hand allows the user to interact with the surrounding environment using the other hand. Further, the availability of one-handed interactions has beneficial applications in the product design fields of accessibility and universal design. Similarly, other embodiments enable a user to interact with wearable computing devices worn on other locations of the body (e.g., a head-mounted mobile electronic device) using one hand. Embodiments further provide for interacting with a wearable computing device using a hand that cannot reach the device. For example, embodiments of the present invention enable a user to interact with a smart watch worn on the left wrist of the user using the left hand of the user, thereby leaving the right hand of the user free to interact with the surrounding environment. Embodiments of the present disclosure, using a smart watch as a representative example of a wearable computing device, are discussed with respect to the figures below.

Figure 1:
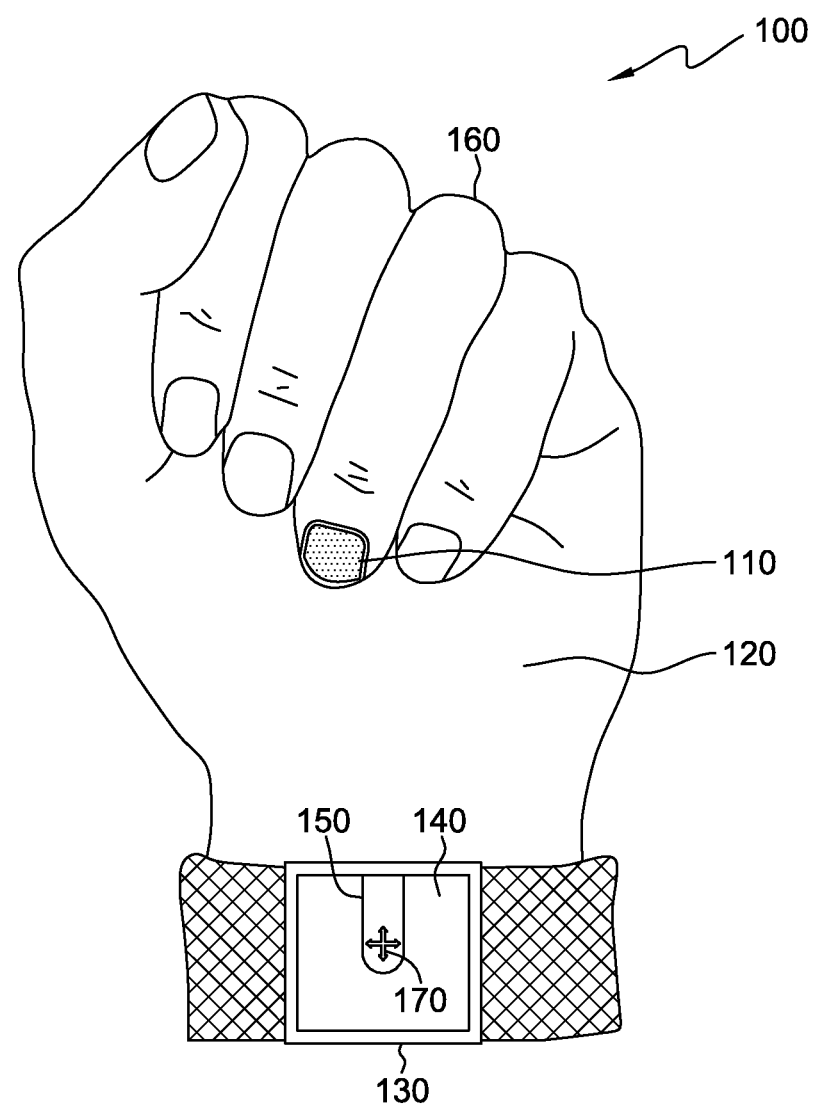
FIG. 1 is a diagram illustrating a control system for a wearable computing device, in accordance with an embodiment of the present disclosure.

FIG. 1 depicts an embodiment of control system 100 for controlling smart watch 130, which is an example of a wearable computing device. Control finger 160 is a finger of proximate hand 120. In FIG. 1, interface device 110 is worn on control finger 160. Interface device 110, however, can be worn on any finger of proximate hand 120. Smart watch 130 includes screen 140 and executes GUI software 235, as described herein with respect to FIG. 3. GUI software 235 can, among other things, cause screen 140 to display a GUI that includes control finger graphic 150 and cursor 170. Smart watch 130 also includes internal and external hardware components, as depicted and described in further detail with respect to FIG. 4.

In the embodiment depicted in FIG. 1, a user controls smart watch 130 using control finger 160. Other embodiments of the present invention, however, allow a user to control other wearable computing devices, such as, a head-mounted computing device, a smart phone, a camera, a laptop computer, a tablet computer, a netbook computer, a personal computer (PC), a desktop computer, or a television. In general, any computing device or combination of devices with the capability to display a GUI and execute GUI software 235 can be controlled in a substantially similar manner to smart watch 130.

In the embodiment depicted in FIG. 1, interface device 110 enables smart watch 130 to translate movements of control finger 160 based, at least in part, on data received from interface device 110. Smart watch 130 translates movements of control finger 160 into movements of one or both of control finger graphic 150 and cursor 170. In the embodiment depicted in FIG. 1, for example, interface device 110 is an electronic sensory device that is worn over the finger nail of control finger 160. Control finger 160 can be any finger of proximate hand 120. Interface device 110 is removably connected to control finger 160. In some embodiments, interface device 110 is adhesively connected to the finger nail of control finger 160. Interface device 110 includes circuitry and one or more electronic devices that allow interface device 110 to communicate with smart watch 130. Interface device 110 also includes circuitry and one or more movement-sensing electronic devices that allow smart watch 130 to translate movements of control finger 160. For example, interface device 110 can include one or more clocks and one or more accelerometers to detect accelerations in one, two, or three axes from which displacement vectors can be determined. In various embodiments, the accelerometers detect accelerations via piezoelectric effects, piezoresistive effects, capacitive effects, or another method known in the art. In some embodiments, interface device 110 also includes one or more gyroscopes to detect rotational movements in pitch, yaw, and roll. In various embodiments, the gyroscopes detect rotational movements via piezoelectric effects, hemispherical resonators, cylindrical resonators, tuning forks, vibrating wheels, or another method known in the art. The accelerometers and/or gyroscopes can be micro-electro-mechanical systems (MEMS).

In other embodiments, interface device 110 includes one or more electronic devices that enable GUI software 235 to determine the displacement of interface device 110 relative to a surface. In such embodiments, interface device 110 is a ring, thimble, or glove that includes one or more optoelectronic sensors that enable GUI software 235 to determine the relative motion of interface device 110 using digital image correlation techniques. In some embodiments, interface device 110 includes light-emitting diodes (LEDs) or lasers to increase imaging resolution. Increased imaging resolution can improve tracking performance.

In the embodiment depicted in FIG. 1, interface device 110 includes circuitry and one or more force sensing electronic devices that enable GUI software 235 to determine when a user wishes to perform an action on screen 140 (e.g., selecting an icon on screen 140). For example, interface device 110 includes one or more piezoelectric or capacitive MEMS load cells (not shown on FIG. 1 due to the relatively small scale of MEMS) that generate force data. In some embodiments, interface device 110 has an edge that extends beyond the tip of control finger 160. In such embodiments, a MEMS load cell is located on or near the edge of interface device 110 and measures forces between the edge of interface device 110 and surfaces in the surrounding environment. In various embodiments, the MEMS load cell is positioned on any portion of interface device 110 that enables the load cell to measure forces between interface device 110 and surfaces in the environment. GUI software 235 retrieves and analyzes the force data to determine if interface device 110 measured a force that exceeds one or more thresholds, as described herein with respect to FIG. 3. In other embodiments, interface device 110 includes one or more MEMS strain gauges that are operatively positioned on interface device 110 to measure strains across interface device 110. The MEMS strain gauges generate strain data that GUI software 235 can utilize in a similar fashion as the force data. Persons skilled in the art will understand that stresses and/or forces can be inferred from strain data. In general, interface 110 can include one or more devices that generate data that describes a result of bringing interface device 110 into contact with a surface in the environment around interface device 110.

In various embodiments, interface device 110 utilizes an internal or external power source. Interface device 110 can receive power via at least one of wired charging, inductive charging, radio-frequency charging, photovoltaic effects, piezoelectric effects, thermoelectric effects, or another method known in the art.

In other embodiments, interface device 110 is a different type of wearable electronic device that can support the functionality attributed herein to interface device 110. For example, interface device 110 can be a ring, a thimble, or a glove that covers one or more finger tips. If interface device 110 includes sufficient computer storage and computer processing power, interface device 110 can include logic that can perform the functions described herein relating to determining the movement of control finger 160 and detecting forces applied to or by control finger 160. Alternatively, interface device 110 transmits data to another device (e.g., smart watch 130) that performs such determinations (e.g., by GUI software 235).

In yet other embodiments, interface device 110 is a flexible touchpad that includes one or more wireless communication units, force-sensors, and movement-sensors, such that interface device 110 performs substantially similar functions as those described herein. The flexible touchpad can include one or more capacitive sensors arranged to detect the movement of control finger 160 on interface device 110. The user may wear the flexible touchpad on any finger of the proximate hand or on the palm of the proximate hand. For example, the user can wear the flexible touchpad on the thumb and use the index finger as control finger 160 to take advantage of the dexterity of the index finger when acting on the thumb, or vice-versa. The user may also wear a rigid touchpad on any finger of the proximate hand or on the palm of the proximate hand. The touchpad can be incorporated into a glove or coupled directly to the proximate hand.

In the embodiment depicted in FIG. 1, the user moves control finger graphic 150 and cursor 170 to various points on screen 140 using control finger 160. In other embodiments, two or more control fingers facilitate interaction with smart watch 130 via gestures such as pinching, swiping, or rotating two or more control fingers about a point. The user can select any point on screen 140 by pressing control finger 160 against a surface. The surface can be any surface in the environment around the user, including any surface on proximate hand 120. For example, the user can press control finger 160 against a palm of proximate hand 120 or against another finger of proximate hand 120 to select a point on screen 140.

Control finger graphic 150 is a GUI element that is a representation of a tip portion of a finger. Control finger graphic 150 extends from the perimeter of screen 140. In some embodiments, control finger graphic 150 is an outline of a tip portion of a finger. In other embodiments, control finger graphic 150 is any shape that resembles a tip portion of a finger. Control finger graphic 150 can be opaque or translucent. If control finger graphic 150 is translucent, portions of the GUI that are beneath control finger graphic 150 remain at least partially visible. In addition, the size, shape, and position of control finger graphic 150 change in response to movement of control finger 160. In the embodiment depicted in FIG. 1, for example, control finger graphic 150 lengthens and increases in area if a user moves control finger 160 toward smart watch 130.

In some embodiments, pressing the edge of interface device 110 against a surface causes an interaction with smart watch 130 that corresponds to the position of an active pixel on the GUI. Moving control finger 160 moves the active pixel to various positions on the GUI. It is apparent to persons skilled in the art that the active pixel is not easily distinguishable from other pixels on screen 140 (thus the active pixel is not shown in FIG. 1). In general, the active pixel is within control finger graphic 150 and moves in sync with control finger graphic 150. While control finger graphic 150 indicates the general location of the active pixel, some embodiments have functionality that benefits from a more accurate indication of the position of the active pixel. For example, control finger graphic 150 may be too large to enable a user to precisely select one icon out of a plurality of relatively small icons.

Embodiments of the present disclosure recognize a need to indicate the location of the active pixel on screen 140 with more accuracy than the accuracy provided by control finger graphic 150. Accordingly, the embodiment depicted in FIG. 1 includes cursor 170. Cursor 170 is an arrow-headed cross that moves in sync with the active pixel such that the active pixel remains at the center of the cross. In general, cursor 170 is shaped to indicate the position of the active pixel and/or is small enough to precisely select GUI icons. For example, cursor 170 can also be an arrow with the active pixel at the tip of the arrow or a circle with the active pixel at the center of the circle, wherein the circle is approximately the same size as, or smaller than, a GUI icon. In some embodiments, cursor 170 includes one or more visual design features that enable a user to differentiate the active pixel from other pixels that form cursor 170. For example, cursor 170 can include pixels of two or more colors, wherein the active pixel (and in some embodiments, the pixels in the vicinity of the active pixel) is of a different color than other pixels that form cursor 170 and/or control finger graphic 150. In various embodiments, screen 140 can display one of control finger graphic 150 and cursor 170 or both of control finger graphic 150 and cursor 170.

In general, the GUI can include any form of indicator that is responsive to the movements of control finger 160. In some embodiments, the indicator can be a visual object (e.g., control finger graphic 150 and cursor 170) that changes position on screen 140 in response to movements of control finger 160 and includes an active pixel. In other embodiments, the indicator can be a change in color, shape, and/or size of one or more icons or glyphs. In some embodiments, movements of control finger 160, such as extending and retracting control finger 160, can cause the GUI to cycle through a selection of two or more icons, wherein movements of control finger 160 cause a different icon or glyph to become selected. For example, extending control finger 160 away from the palm of proximate hand 120 can cause the next icon in a series to change in appearance and become "selected," wherein the icon can become "active" (i.e., the GUI executes code that corresponds to the "active" icon) upon some other user action. Conversely, retracting control finger 160 toward the palm of proximate hand 120 can, for example, deselects an icon, and cause the GUI to cycle through the icons in the reverse direction. In yet other embodiments, the indicator can be code that causes a change in color, shape, and/or size in order to indicate that code is being or has been executed in response to a movement of control finger 160. For example, a first movement of control finger 160 can correspond to a "yes" command and a second movement of control finger 160 can correspond to a "no" command. In such embodiments, the indicator shows whether control finger 160 issued the "yes" or "no" command. A user can issue a "yes" command by extending control finger 160 away from the palm of proximate hand 120. Conversely, a user can issue a "no" command by retracting control finger 160 toward the palm of proximate hand 120, or vice versa. If smart watch 130 allows a user to receive phone calls, for example, extending control finger 160 could allow the user to accept a call and retracting control finger 160 could allow the user to reject the call.

Figure 2:
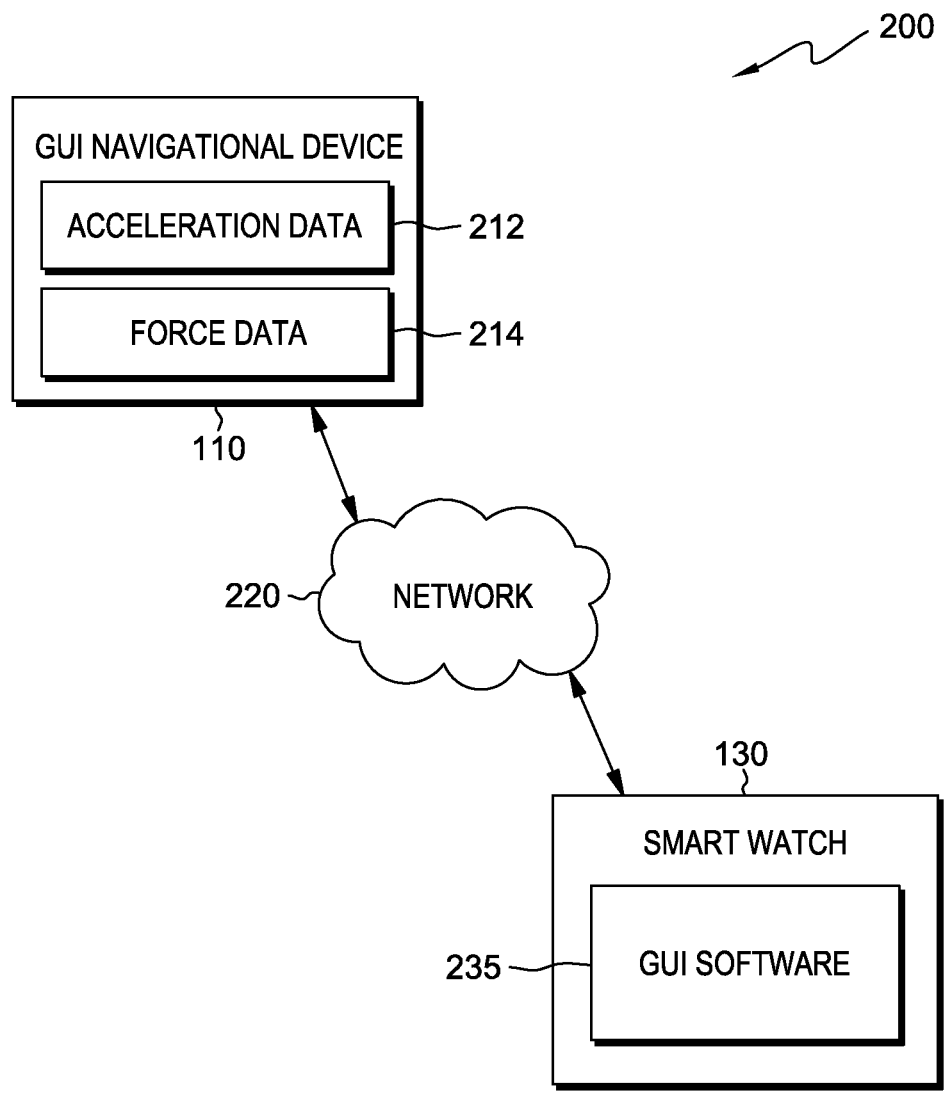
FIG. 2 is a functional block diagram illustrating a computing environment, in accordance with an embodiment of the present disclosure.

FIG. 2 is a functional block diagram depicting a computing environment, in accordance with an embodiment of the present disclosure. For example, FIG. 2 is a functional block diagram depicting control system 100 within computing environment 200. Computing environment 200 includes interface device 110 and smart watch 130, connected over network 220.

In the embodiment depicted in FIG. 2, GUI software 235 is stored on smart watch 130. In other embodiments, GUI software 235 is stored on another computing device, provided smart watch 130 can access and is accessible by GUI software 235. In yet other embodiments, GUI software 235 is stored externally and accessed through a communication network, such as network 220. Smart watch 130 executes GUI software 235 to display a GUI on screen 140. Smart watch 130 also executes GUI software 235 to enable a user to interact with smart watch 130 using interface device 110, as described herein. In some embodiments, GUI software 235 operates, at least in part, to translate movements of interface device 110 into movements of control finger graphic 150 and cursor 170, as discussed in greater detail with respect to FIG. 3. GUI software 235 can also include additional functionality to facilitate human interaction with smart watch 130.

Embodiments of the present disclosure recognize a need to indicate how changes in the orientation of smart watch 130 are reflected in the operation of GUI software 235. In some embodiments, smart watch 130 includes one or more gyroscopes (not shown for clarity). Based, at least in part, on data provided by the one or more gyroscopes, GUI software 235 can reorient a GUI on screen 140. For example, GUI software 235 can determine the angular displacement of smart watch 130 and angularly displace the GUI by the same amount, but in the opposite direction, such that the GUI is not affected by the change in orientation of smart watch 130. In embodiments like the embodiment depicted in FIG. 1, however, the orientation of control finger 160 changes in relation to the GUI when the GUI is angularly displaced. In some embodiments, GUI software 235 angularly displaces control finger graphic 150 in the same direction as smart watch 130 such that control finger graphic 150 approximates the orientation of control finger 160 in relation to the GUI. In other embodiments, GUI software 235 angularly displace control finger graphic 150 in the opposite direction of smart watch 130. In such embodiments, the orientation of control finger graphic 150 may not reflect the orientation of control finger 160 in relation to the GUI.

Network 220 can be, for example, a local area network (LAN), a wide area network (WAN) such as the internet, or a combination of the two, and can include wired, wireless, fiber optic or any other connection known in the art. In general, network 220 can be any combination of connections and protocols that will support communications between interface device 110 and smart watch 130, in accordance with a desired embodiment of the present invention.

In the embodiment depicted in FIG. 2, interface device 110 stores acceleration data 212. Acceleration data 212 describes acceleration(s) of interface device 110. In some embodiments, interface device 110 includes one or more MEMS accelerometers that generate acceleration data 212. In some embodiments, interface device 110 includes sufficient hardware and software to determine and store velocity data and/or displacement data generated from, at least is part, acceleration data 212. In other embodiments, interface device 110 stores a combination of acceleration data, velocity data, and displacement data. In general, interface device 110 can store any data from which the displacement of interface device 110 can be determined as described herein.

In the embodiment depicted in FIG. 2, interface device 110 also stores force data 214. Force data 214 describes force(s) that result from bringing interface device 110 into contact with a surface. In some embodiments, interface device 110 includes one or more MEMS load cells, as described herein, that generate force data 214. In various embodiments, interface device 110 stores pressure data, strain data, or another parameter that describes a result of bringing interface device 110 into contact with a surface.

Figure 3:
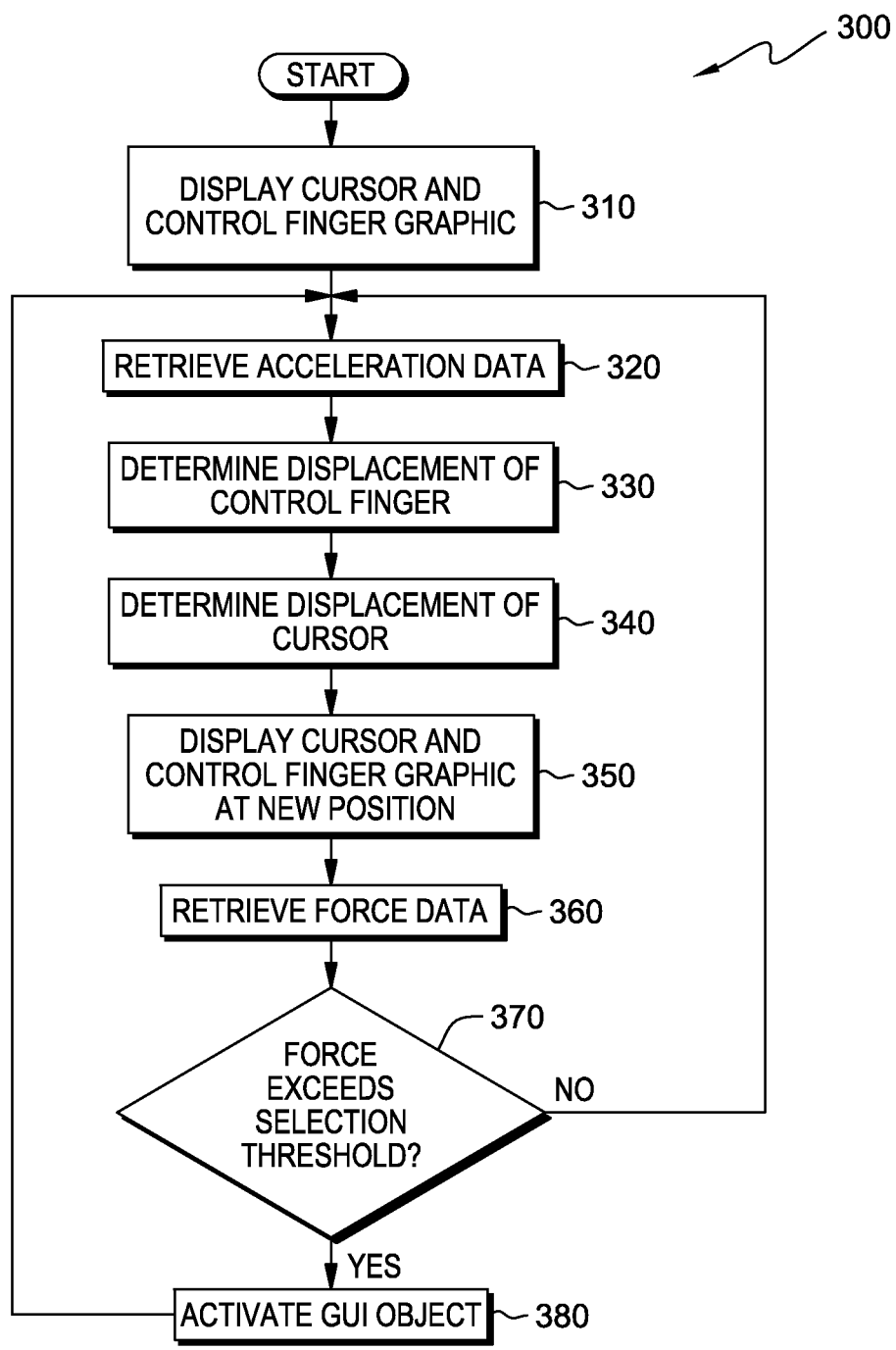
FIG. 3 is a flowchart depicting operations for one-handed operation of a mobile computing device within the computing environment of FIG. 2, in accordance with an embodiment of the present disclosure.

FIG. 3 is a flowchart depicting operations 300 of an exemplary embodiment of GUI software 235 within the computing environment of FIG. 2, in accordance with an embodiment of the present disclosure.

In step 310, GUI software 235 causes display screen 140 to display a GUI that includes cursor 170 and control finger graphic 150.

In step 320, GUI software 235 retrieves acceleration data. In some embodiments GUI software 235 retrieves acceleration data from interface device 110 over network 220. In other embodiments GUI software 235 retrieves acceleration data from local storage, wherein interface device 110 transmitted the acceleration data to smart watch 130 over network 220.

In step 330, GUI software 235 determines the directional displacement (hereafter "the displacement") of interface device 110. In some embodiments, the displacement of interface device 110 is determined from the acceleration data by doubly integrating the acceleration data over a period of time. In other embodiments GUI software 235 retrieves velocity data in step 320 in order to similarly perform step 330. In yet other embodiments GUI software 235 retrieves displacement data in step 320, and thus step 330 is unnecessary. In some embodiments, interface device 110 has sufficient volume to include hardware and software to determine the displacement of interface device 110. Interface device 110 can also include hardware and software to translate the displacement of interface device 110 into displacement data for cursor 170 and/or control finger graphic 150; GUI software 235 can then retrieve the displacement data in step 320 and skip steps 330 and 340.

In step 340, GUI software 235 determines the displacement of cursor 170 and/or control finger graphic 150 by translating the displacement of interface device 110. In some embodiments, GUI software 235 determines the magnitude of the displacement of cursor 170 and/or control finger graphic 150 in a one-to-one ratio with the magnitude of the displacement of interface device 110. In other embodiments, the ratio is more or less than one-to-one. The user can set the ratio according to his or her preference, or the ratio can be set automatically according to the parameters of GUI software 235.

In step 350, GUI software 235 causes screen 140 to display cursor 170 and/or control finger graphic 150 at a new position on screen 140 in accordance with step 340.

In step 360, GUI software 235 retrieves force data. In some embodiments GUI software 235 retrieves force data from interface device 110 over network 220. In other embodiments GUI software 235 retrieves force data from local storage, wherein interface device 110 transmitted the force data to smart watch 130 over network 220.

In decision 370, GUI software 235 analyzes the force data retrieved in step 360 and determines if any of the force measurements exceed a selection threshold force. In some embodiments, GUI software 235 determines an average force over a sampling period from the force data retrieved in step 360. In such embodiments, GUI software 235 determines if the average force exceeds the selection threshold force in step 370. In yet other embodiments, GUI software 235 determines the number of force measurements that exceed the threshold force over a sampling period and subsequently determine if this number is greater than a threshold number. In general, GUI software determines if a threshold parameter has been exceeded in step 370. A user can set the selection threshold according to his or her preference, or the selection threshold can be set automatically according to the parameters of GUI software 235. Alternatively, some embodiments include hardware and software to detect and translate the movements of muscles and/or tendons in the wrist, forearm, or fingers and determine if the user wishes to perform an action on the GUI. Muscle and/or tendon sensing hardware and software may be used alone, on in conjunction with pressure sensing hardware and software, to determine if the user wishes to perform an action on the GUI.

In some embodiments, GUI software 235 includes logic that is substantially similar to the logic of decision 370 in order to determine if movements of control finger 160 and interface device 110 are intended to interact with smart watch 130. In such embodiments, GUI software 235 updates the position of an indicator (e.g., control finger graphic 150 and cursor 170) if the user exceeds an interaction threshold. The interaction threshold can be a force, a number of measurements, or the magnitude of an acceleration, velocity, or displacement. For example, GUI software 235 retrieves force data as described herein with respect to step 360 and determines if the force data indicates that the interaction threshold was exceeded. The interaction threshold hold can be a threshold that is similar to one of the thresholds described herein with respect to the section threshold force. The interaction threshold has a value that enables the GUI to respond to purposeful movements of control finger 160 but ignore incidental movements of control finger 160.

If a pressure exceeds the selection threshold pressure, GUI software 235 advances to step 380 (decision 370, YES branch). In step 380, GUI software 235 activates a GUI object that corresponds to the position of cursor 170 and/or the position of control finger graphic 150 on the GUI. Following step 380, GUI software 235 proceeds to step 320. In embodiments that include more than one interface device of the type depicted in FIG. 1, a greater number of control finger gestures is possible in order to increase GUI functionality. In some embodiments, two interface devices enable GUI software 235 to recognize "pinch-to-zoom" gestures. For example, moving two interface devices apart causes GUI software 235 to "zoom-out" on a portion of screen 140. Similarly, moving two interface devices closer together causes GUI software 235 to "zoom-in" on a portion of screen 140. In other embodiments, swiping with two or more interface devices and rotating two or more interface devices about a point provides additional functionality.

If no pressure measurement exceeds the selection threshold pressure, GUI software 380 advances to step 320 (decision 370, NO branch).

Figure 4:
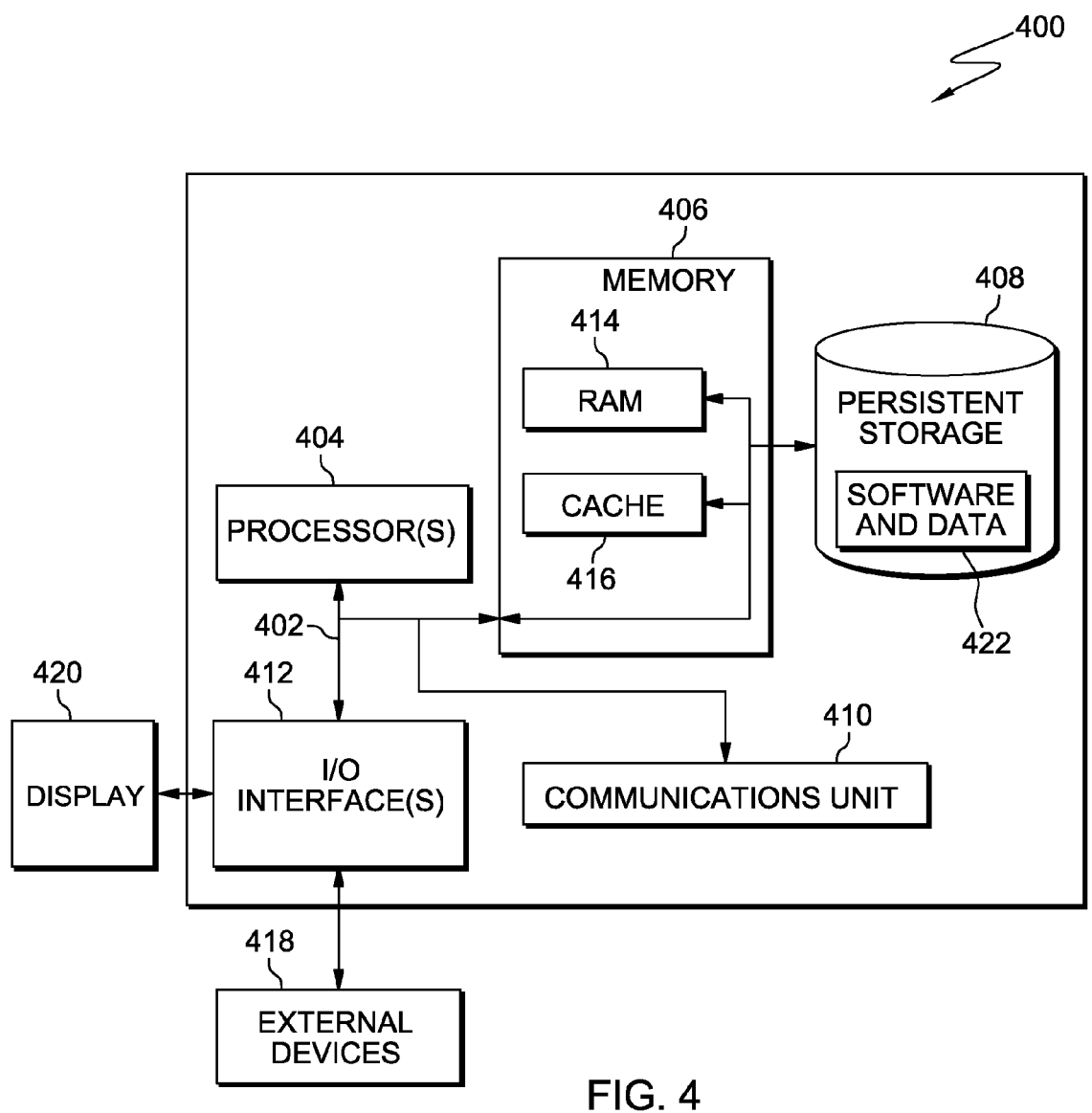
FIG. 4 is a block diagram of components of a computing device executing operations for one-handed operation of a wearable computing device, in accordance with an embodiment of the present disclosure.

FIG. 4 depicts computer system 400, which is an example of a system that can be configured to execute GUI software 235. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory 414 (RAM 414). In general, memory 406 can include any suitable volatile or non-volatile computer readable storage media. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective processors 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 422 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
displaying, by one or more computer processors, a control finger graphic on a graphical user interface of a wearable computing device, wherein the control finger graphic includes an outline of a tip portion of a representative finger, the outline of the tip portion of the representative finger extending from a perimeter of the graphical user interface, and wherein a cursor overlays a portion of the control finger graphic and identifies an active pixel that moves in synch with the control finger graphic;
determining, by one or more computer processors, a directional displacement of an interface device, and in response, moving, by one or more computer processors, the control finger graphic and the cursor from a first position on the graphical user interface to a second position on the graphical user interface, based, at least in part, on the directional displacement of the interface device, wherein the interface device is a wearable electronic device that is removably connected to a control finger of a user of the wearable computing device;
responsive to determining, by one or more computer processors, that a position of the active pixel on the graphical user interface corresponds to a position of a graphical user interface object, modifying, by one or more computer processors, the graphical user interface to visually indicate an association between the active pixel and the graphical user interface object; and
responsive to determining, by one or more computer processors, that a force exerted by a surface in contact with the interface device exceeds a threshold, activating, by one or more computer processors, the graphical user interface object.

2. The method of claim 1, wherein the directional displacement of the interface device is determined based, at least in part, on acceleration data generated by at least one accelerometer, and wherein the at least one accelerometer is connected to the interface device.

3. The method of claim 2, wherein the interface device is adhesively connected to a fingernail of the control finger.

4. The method of claim 1, wherein the wearable computing device is a smart watch, and wherein the control finger is a finger of a proximate hand to the smart watch.

5. The method of claim 4, further comprising:
determining, by one or more computer processors, an angular displacement of the smart watch, and in response:
on a screen of the smart watch, angularly displacing, by one or more computer processors, the graphical user interface in an opposite direction of a direction of the angular displacement of the smart watch such that an orientation of the graphical user interface with respect to the user of the smart watch is not effected by the angular displacement of the smart watch, and
on the graphical user interface, angularly displacing, by one or more computer processors, the control finger graphic in the direction of the angular displacement of the smart watch such that an orientation of the control finger graphic on the graphical user interface approximates an orientation of the finger of the user with respect to the graphical user interface.

6. The method of claim 1, wherein the wearable computing device is a head-mounted mobile computing device.

7. The method of claim 1, wherein the cursor is a cross that identifies the active pixel as a pixel at a center of the cross.

8. A computer program product for one-handed operation of a mobile computing device, the computer program product comprising:
a computer readable storage medium and program instructions stored on the computer readable storage medium, the program instructions comprising:
program instructions to display, by one or more computer processors, a control finger graphic on a graphical user interface of a wearable computing device, wherein the control finger graphic includes an outline of a tip portion of a representative finger, the outline of the tip portion of the representative finger extending from a perimeter of the graphical user interface, and wherein a cursor overlays a portion of the control finger graphic and identifies an active pixel that moves in synch with the control finger graphic;
program instructions to determine, by one or more computer processors, a directional displacement of an interface device, and in response, move, by one or more computer processors, the control finger graphic and the cursor from a first position on the graphical user interface to a second position on the graphical user interface, based, at least in part, on the directional displacement of the interface device, wherein the interface device is a wearable electronic device that is removably connected to a control finger of a user of the wearable computing device;
program instructions to, responsive to determining, by one or more computer processors, that a position of the active pixel on the graphical user interface corresponds to a position of a graphical user interface object, modify, by one or more computer processors, the graphical user interface to visually indicate an association between the active pixel and the graphical user interface object; and
program instructions to, responsive to determining, by one or more computer processors, that a force exerted by a surface in contact with the interface device exceeds a threshold, activate, by one or more computer processors, the graphical user interface object.

9. The computer program product of claim 8, wherein the directional displacement of the interface device is determined based, at least in part, on acceleration data generated by at least one accelerometer, and wherein the at least one accelerometer is connected to the interface device.

10. The computer program product of claim 9, wherein the interface device is adhesively connected to a fingernail of the control finger.

11. The computer program product of claim 10, wherein the wearable computing device is a smart watch, and wherein the control finger is a finger of a proximate hand to the smart watch.

12. The computer program product of claim 11, the program instructions further comprising:
program instructions to determine, by one or more computer processors, an angular displacement of the smart watch, and in response:

on a screen of the smart watch, angularly displace, by one or more computer processors, the graphical user interface in an opposite direction of a direction of the angular displacement of the smart watch such that an orientation of the graphical user interface with respect to the user of the smart watch is not effected by the angular displacement of the smart watch, and on the graphical user interface, angularly displace, by one or more computer processors, the control finger graphic in the direction of the angular displacement of the smart watch such that an orientation of the control finger graphic on the graphical user interface approximates an orientation of the finger of the user with respect to the graphical user interface.

13. A computer system for one-handed operation of a mobile computing device, the computer system comprising:

one or more computer processors;

one or more computer readable storage media;

program instructions stored on the computer readable storage media for execution by at least one of the one or more processors, the program instructions comprising:

program instructions to display, by one or more computer processors, a control finger graphic on a graphical user interface of a wearable computing device, wherein the control finger graphic includes an outline of a tip portion of a representative finger, the outline of the tip portion of the representative finger extending from a perimeter of the graphical user interface, and wherein a cursor overlays a portion of the control finger graphic and identifies an active pixel that moves in synch with the control finger graphic;

program instructions to determine, by one or more computer processors, a directional displacement of an interface device, and in response, move, by one or more computer processors, the control finger graphic and the cursor from a first position on the graphical user interface to a second position on the graphical user interface, based, at least in part, on the directional displacement of the interface device, wherein the interface device is a wearable electronic device that is removably connected to a control finger of a user of the wearable computing device;

program instructions to, program instructions to, responsive to determining, by one or more computer processors, that a position of the active pixel on the graphical user interface corresponds to a position of a graphical user interface object, modify, by one or more computer processors, the graphical user interface to visually indicate an association between the active pixel and the graphical user interface object; and program instructions to, responsive to determining, by one or more computer processors, that a force exerted by a surface in contact with the interface device exceeds a threshold, activate, by one or more computer processors, the graphical user interface object.

14. The computer system of claim 13, wherein the directional displacement of the interface device is determined based, at least in part, on acceleration data generated by at least one accelerometer, and wherein the at least one accelerometer is connected to the interface device.

15. The computer system claim 14, wherein the interface device is adhesively connected to a fingernail of the control finger.

16. The computer system of claim 15, wherein the wearable computing device is a smart watch, and wherein the control finger is a finger of a proximate hand to the smart watch.

17. The computer system of claim 16, the program instructions further comprising:

program instructions to determine, by one or more computer processors, an angular displacement of the smart watch, and in response:

on a screen of the smart watch, angularly displace, by one or more computer processors, the graphical user interface in an opposite direction of a direction of the angular displacement of the smart watch such that an orientation of the graphical user interface with respect to the user of the smart watch is not effected by the angular displacement of the smart watch, and on the graphical user interface, angularly displace, by one or more computer processors, the control finger graphic in the direction of the angular displacement of the smart watch such that an orientation of the control finger graphic on the graphical user interface approximates an orientation of the finger of the user with respect to the graphical user interface.

* * * * *